(12) United States Patent
Kumon (10) Patent No.: US 8,825,406 B2
(45) Date of Patent: Sep. 2, 2014

(54) NAVIGATION APPARATUS

(75) Inventor: Hitoshi Kumon, Togo-cho (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/977,355

(22) PCT Filed: Dec. 28, 2010

(86) PCT No.: PCT/JP2010/073802
§ 371 (c)(1),
(2), (4) Date: Jun. 28, 2013

(87) PCT Pub. No.: WO2012/090325
PCT Pub. Date: Jul. 5, 2012

(65) Prior Publication Data
US 2013/0289875 A1    Oct. 31, 2013

(51) Int. Cl.
*G01C 21/36* (2006.01)
(52) U.S. Cl.
CPC ................................. *G01C 21/36* (2013.01)
USPC .......................................................... 701/533
(58) Field of Classification Search
USPC .......................................................... 701/533
See application file for complete search history.

(56) References Cited

U.S. PATENT DOCUMENTS

| | | | | |
|---|---|---|---|---|
| 5,568,390 | A * | 10/1996 | Hirota et al. | 701/410 |
| 6,694,255 | B1 * | 2/2004 | Kainuma et al. | 701/428 |
| 7,400,968 | B2 * | 7/2008 | Sakano et al. | 701/437 |
| 7,729,854 | B2 * | 6/2010 | Muramatsu | 701/420 |
| 7,880,602 | B2 * | 2/2011 | Kasamatsu | 340/461 |
| 2002/0167589 | A1 * | 11/2002 | Schofield et al. | 348/148 |
| 2005/0071082 | A1 * | 3/2005 | Ohmura et al. | 701/211 |
| 2006/0142939 | A1 * | 6/2006 | Muramatsu | 701/209 |
| 2009/0005961 | A1 * | 1/2009 | Grabowski et al. | 701/200 |
| 2010/0268452 | A1 * | 10/2010 | Kindo et al. | 701/201 |
| 2012/0050138 | A1 * | 3/2012 | Sato et al. | 345/4 |

FOREIGN PATENT DOCUMENTS

| | | |
|---|---|---|
| JP | 2002 267470 | 9/2002 |
| JP | 2003 194556 | 7/2003 |
| JP | 2005 107917 | 4/2005 |
| JP | 2005 107918 | 4/2005 |
| JP | 2005 127995 | 5/2005 |
| JP | 2005 127996 | 5/2005 |
| JP | 2006 284195 | 10/2006 |
| JP | 2008 37167 | 2/2008 |
| JP | 2011 47649 | 3/2011 |

OTHER PUBLICATIONS

International Search Report Issued Mar. 15, 2011 in PCT/JP10/073802 Filed Dec. 28, 2010.

* cited by examiner

*Primary Examiner* — Thomas Tarcza
*Assistant Examiner* — Alex C Dunn
(74) *Attorney, Agent, or Firm* — Oblon, Spivak, McClelland, Maier & Neustadt, L.L.P.

(57) ABSTRACT

A navigation apparatus that performs route guidance to a destination includes a display unit that displays an image so as to be superimposed on a field of view of a driver and a control unit that displays an image of a guidance object for route guidance on the display unit such that the guidance object moves along a route in advance, thereby performing the route guidance. The control unit displays an image of an object different from a vehicle as the guidance object.

9 Claims, 6 Drawing Sheets

Fig.6

# NAVIGATION APPARATUS

TECHNICAL FIELD

The present invention relates to a navigation apparatus that performs traveling route guidance to a destination.

BACKGROUND ART

A navigation apparatus has been known which displays a route to a destination on a display or performs route guidance with a voice to guide the driver through a traveling route. For example, Patent Literature 1 discloses a route guidance apparatus which displays a virtual preceding vehicle so as to be superimposed on a scene in front of a route guidance vehicle, thereby guiding the driver through a traveling route.

In the apparatus disclosed in Patent Literature 1, when a virtual traveling vehicle interferes with an obstacle, the display position of the virtual preceding vehicle is changed to the upper side or horizontally in order to prevent the interference between the virtual traveling vehicle and the obstacle. When the host vehicle approaches a guidance intersection, display is performed in an aspect in which the virtual preceding vehicle is accelerated in front of the guidance intersection, is decelerated at the intersection, and is temporarily stopped at the corner. In this way, the navigation apparatus notifies the driver of the intersection where the driver needs to turn.

CITATION LIST

Patent Literature

[Patent Literature 1] Japanese Unexamined Patent Application Publication No. 2005-127995

SUMMARY OF INVENTION

Technical Problem

However, in the apparatus disclosed in Patent Literature 1, since traveling route guidance is performed using the virtual traveling vehicle, it is difficult to easily recognize route guidance. For example, when the actual vehicle in front of the host vehicle and the virtual traveling vehicle overlap each other, in some cases, the driver misses the virtual traveling vehicle to follow.

An object of the invention is to provide a navigation apparatus that performs route guidance which is easily recognized by the driver.

Solution to Problem

In order to achieve the object, a navigation apparatus according to the invention performs route guidance to a destination and includes a display unit that displays an image so as to be superimposed on a field of view of a driver and a control unit that displays an image of a guidance object for the route guidance on the display unit such that the guidance object moves along a route in advance, thereby performing the route guidance. The control unit displays an image of an object different from a vehicle as the guidance object.

In the navigation apparatus according to the invention, the control unit displays the object different from the vehicle as the guidance object on the display unit. Therefore, for example, even when the guidance object and a vehicle in front are displayed so as to overlap each other, it is possible to perform route guidance which is easily recognized by the driver.

The control unit may display an image of an object which moves in a vertical direction or a horizontal direction as the guidance object.

According to this structure, since the guidance object makes a different motion from the neighboring vehicle, it is easy to recognize the guidance object. Therefore, it is possible to perform route guidance which is easily recognized by the driver.

The control unit may display an image of a floating object as the guidance object.

According to this structure, for example, even when the image of the guidance object which rises rapidly is displayed, it is possible to reduce the discomfort of the driver. Therefore, it is possible to perform route guidance which is easily recognized by the driver.

The control unit may display an image of an object which moves forward while shaking as the guidance object.

According to this structure, since the guidance object makes a different motion from a neighboring vehicle, it is easy to recognize the guidance object. Therefore, it is possible to perform route guidance which is easily recognized by the driver.

The control unit may determine whether the guidance object overlaps an object around a host vehicle and displays the guidance object at a position different from that of the object around the host vehicle so as to deviate from the object, thereby performing the route guidance, when it is determined that the guidance object overlaps the object around the host vehicle.

According to this structure, it is possible to prevent the guidance object from being displayed so as to overlap the object around the host vehicle. Therefore, it is possible to perform route guidance which is easily recognized by the driver.

The control unit may display the image of the guidance object on the display unit such that the guidance object is stopped at an intersection where a right or left turn is guided while facing a direction in which it gets out of the intersection and moves in the direction in which it gets out of the intersection, thereby performing the route guidance.

According to this structure, it is possible to clearly transmit the position of the intersection where the driver turns right or left. Therefore, it is possible to perform route guidance which is easily recognized by the driver.

The control unit may change the kind of the guidance object displayed on the display unit in response to an operation of the driver.

According to this structure, it is possible to display the guidance object selected by the driver. Therefore, it is possible to perform route guidance which is easily recognized by the driver.

The control unit may display a three-dimensional image of the guidance object on the display unit.

According to this structure, it is easy to check the distance to the point to be guided by the guidance object. Therefore, it is possible to perform route guidance which is easily recognized by the driver.

Advantageous Effects of Invention

According to the invention, it is possible to perform route guidance which is easily recognized by the driver.

DESCRIPTION OF EMBODIMENTS

Hereinafter, an exemplary embodiment of the invention will be described in detail with reference to the accompanying drawings. In the following description, the same or similar components are denoted by the same reference numerals and the description thereof will not be repeated.

Figure 1:
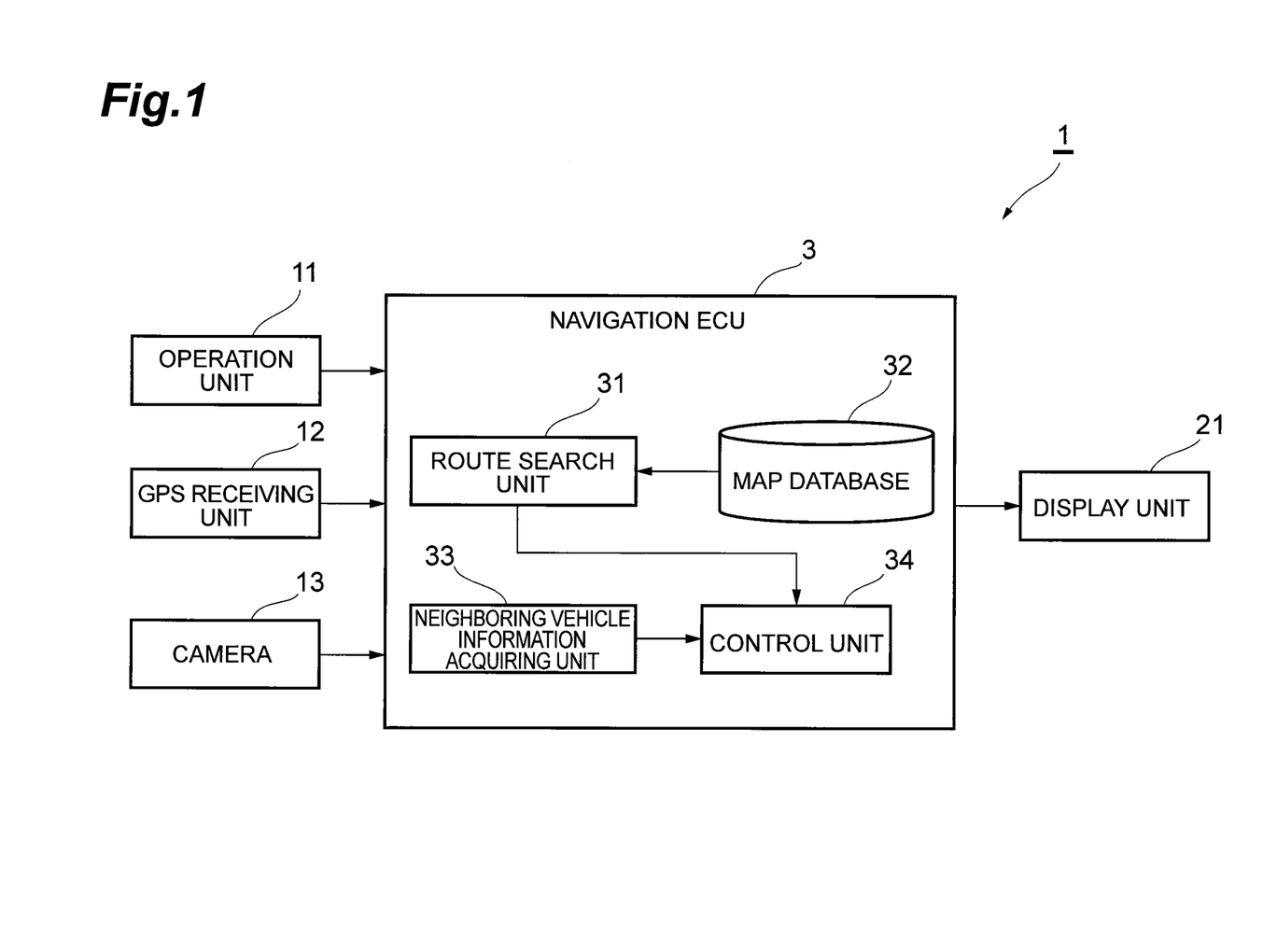
FIG. 1 is a block diagram illustrating the structure of a navigation apparatus according to the invention.

FIG. 1 is a block diagram illustrating a navigation apparatus according to the invention. In FIG. 1, a navigation apparatus 1 includes a navigation ECU (Electronic Control Unit) 3, an operation unit 11, a GPS (Global Positioning System) receiving unit 12, a camera 13, and a display unit 21.

The navigation ECU 3 includes, for example, a CPU (Central Processing Unit) which performs arithmetic processing, a ROM (Read Only Memory) and a RAM (Random Access Memory) which are storage units, an input signal circuit, an output signal circuit, and a power circuit and controls the overall operation of the navigation apparatus 1. The operation unit 11, the GPS receiving unit 12, the camera 13, and the display unit 21 are electrically connected to the navigation ECU 3.

The operation unit 11 is, for example, an operation panel provided in the vehicle and is used by the driver to input various kinds of setting information to the navigation apparatus 1. The operation unit 11 may be, for example, a remote controller or a touch panel using a display. The driver operates the operation unit 11 to set a destination. For example, the driver inputs the name of a facility or a point which the user wants to set as the destination or selects the destination from the registered points. In addition, the driver can operate the operation unit 11 to set the image of a guidance object which will be described below.

The GPS receiving unit 12 receives radio waves from a plurality of GPS satellites to detect the position of the host vehicle. The GPS receiving unit 12 outputs the detected position of the host vehicle as current position information to the navigation ECU 3.

The camera 13 is a device which captures the image of the surroundings of the host vehicle. The camera 13 captures at least the image of the front side of the host vehicle as the image of the surroundings. The camera 13 also captures the images of the side and rear of the host vehicle, if necessary. The camera 13 transmits data for the captured image as image information to the navigation ECU 3.

The navigation ECU 3 includes a route search unit 31, a map database 32, a neighboring vehicle information acquiring unit 33, and a control unit 34. The route search unit 31 searches for a traveling route from the current position to the destination on the basis of the destination input by the operation unit 11 and the current position acquired from the GPS receiving unit 12. For example, the route search unit 31 searches for the route with reference to map information stored in the map database 32. The route search unit 31 outputs the searched route information to the control unit 34.

The map database 32 is a database which stores map information and information associated with the map information. For example, the map database 32 stores map information, such as node information or link information, and road attributes, such as curve information. In addition, the map database 32 is configured such that it can be referred to by the route search unit 31.

The neighboring vehicle information acquiring unit 33 acquires neighboring vehicle information on the basis of the image information obtained by the camera 13. The neighboring vehicle information acquiring unit 33 acquires, as the neighboring vehicle information, the size of a neighboring vehicle and the relative speed and distance between the host vehicle and the neighboring vehicle. The neighboring vehicle information acquiring unit 33 outputs the acquired neighboring vehicle information to the control unit 34. Instead of the camera 13, a radar may be used to acquire the vehicle information.

The control unit 34 generates the image of the guidance object on the basis of route information and displays the image on the display unit 21. The control unit 34 displays an object different from a vehicle as the guidance object on the display unit 21. The control unit 34 may generate an object which moves in the vertical direction or the horizontal direction as the guidance object. For example, the control unit 34 may generate the image of a flame bearer as the guidance object. In addition, for example, the image of a flying object, such as a bird, an airplane, a fairy, or a UFO, may be generated as the image of the object which moves in the vertical direction of the horizontal direction. The control unit 34 receives the guidance object selected by the driver through the operation unit 11 and displays the image of the guidance object selected by the driver on the display unit 21.

The control unit 34 sequentially generates the image of the guidance object such that the guidance object moves along the guidance route searched by the route search unit 31 and displays the image as a video on the display unit 21. In addition, the control unit 34 performs control such that the behavior of the guidance object is appropriately changed on the basis of the surroundings of the host vehicle at an important point, such as a point where the vehicle needs to turn left or right on the guidance route. When the control unit 34 generates the guidance object as described above, the driver can follow the guidance object displayed on the display unit 21 to reach the destination.

The display unit 21 is a device which displays the guidance object generated by the control unit 34 so as to be superimposed on the field of view of the driver. For example, a transmissive head-mounted display which can display an image with parallax between the left and right eyes using binocular convergence or two left and right head-up displays which have a narrow viewing angle and display independent parallax images for the left and right eyes are used as the display unit 21. The display unit 21 displays a three-dimensional image with a variable visible distance in the space in front.

Figure 2:
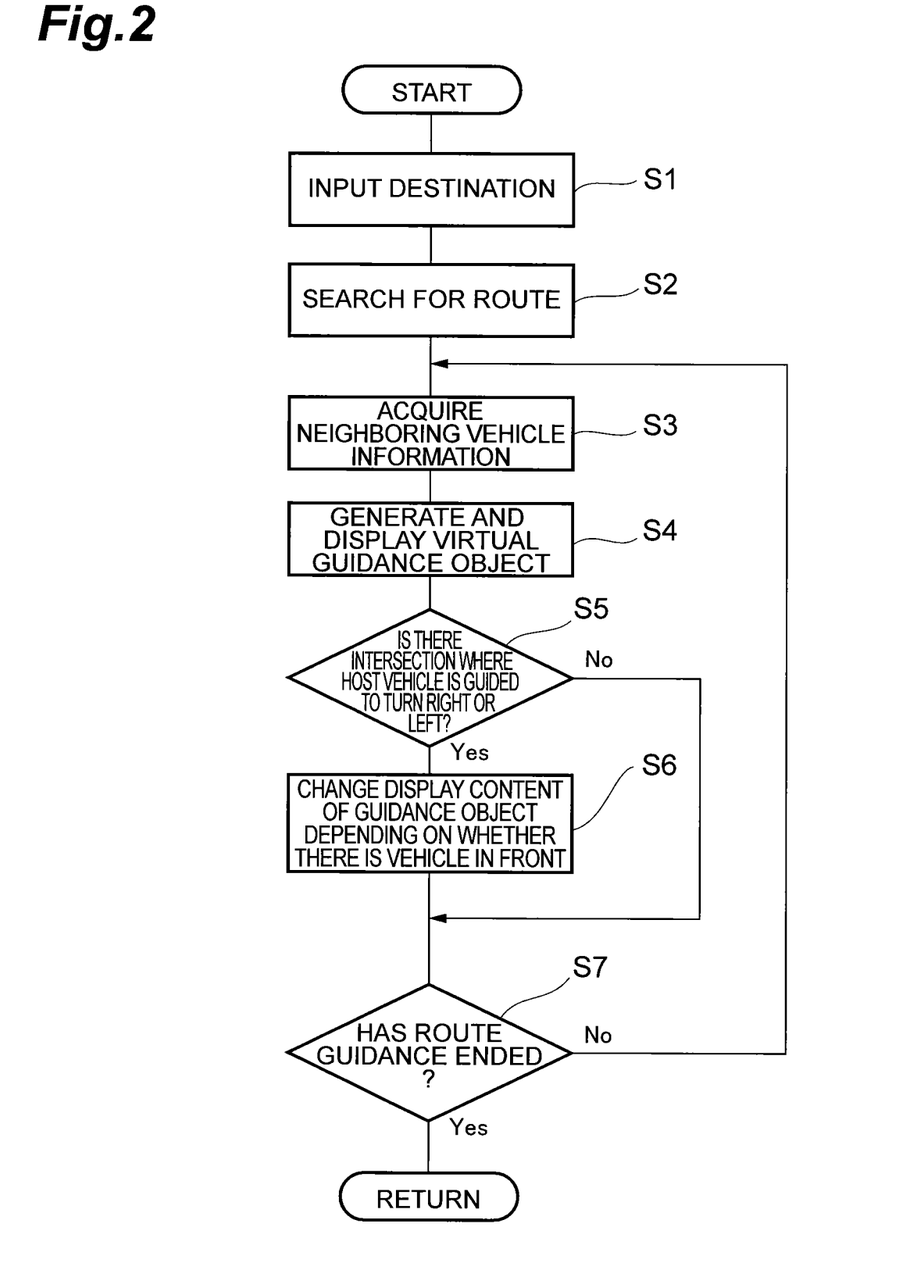
FIG. 2 is a flowchart illustrating the operation of the navigation apparatus shown in FIG. 1.

Next, the operation of the navigation apparatus 1 according to this embodiment will be described. FIG. 2 is a flowchart illustrating the operation of the navigation apparatus according to this embodiment. For example, the process shown in FIG. 2 is repeatedly performed at a predetermined interval from the time when the navigation apparatus 1 is turned on.

First, the navigation apparatus 1 receives the destination input by the driver through the operation unit 11 (S1). Then, the route search unit 31 searches for an appropriate route from the current position to the destination with reference to the map database 32 (S2).

Then, the neighboring vehicle information acquiring unit 33 acquires image information from the camera 13 and acquires neighboring vehicle information (S3). Then, the control unit 34 generates the image of the guidance object which moves along the route obtained in S2 in advance and displays the image on the display unit 21 (S4).

Figure 3:
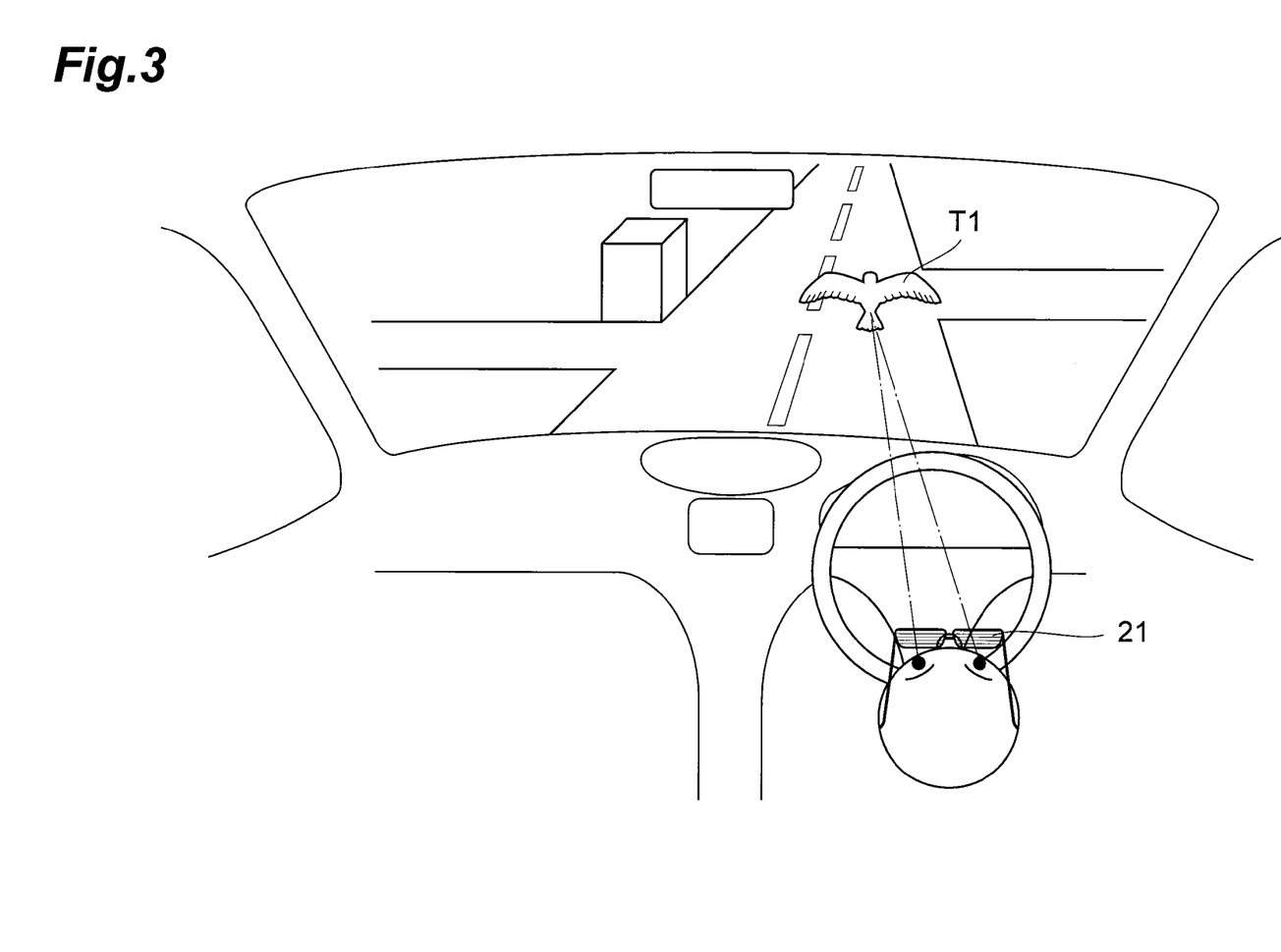
FIG. 3 is an outline diagram illustrating an example of route guidance performed by the navigation apparatus shown in FIG. 1.

An example of route guidance using the guidance object will be described with reference to FIG. 3. FIG. 3 shows an example in which the display unit 21 displays the image of a bird as the guidance object so as to be superimposed on the field of view of the driver for route guidance. As shown in FIG. 3, a guidance object T1 is displayed so as to move along the guided route in advance while floating. Therefore, the host vehicle can travel so as to follow the guidance object and reach the destination along the guided route.

The control unit 34 may control the guidance object T1 such that the guidance object T1 moves forward at an appropriate distance from the host vehicle while shaking. In addition, the control unit 34 may acquire map information or road environmental information, such as the legal speed of the road on which the host vehicle travels, the shape of the road, and road congestion using a road-to-vehicle communication device (not shown) and move the guidance object T1 at an appropriate speed corresponding to the road environmental information such as the legal speed. In this case, the driver drives the vehicle while maintaining an appropriate distance from the guidance object T1. In this way, the driver can drive the vehicle at an appropriate speed without being aware of the speed of the host vehicle.

FIG. 3 shows an example in which there is no vehicle in front of the host vehicle. However, when there is a vehicle in front of the host vehicle, the guidance object T1 is displayed so as to move at a position where the guidance object T1 is not ahead of the vehicle in front, for example, at a position which is immediately before the vehicle in front, in order to prevent a stereoscopic view from being broken due to a memory factor.

The breaking of the stereoscopic view due to the memory factor is a phenomenon caused by the distance perception mechanism of humans. This phenomenon occurs due to another object inserted between the host vehicle and a parallax image when an image which is artificially formed to have a depth using the parallax image is displayed. When another object is interposed between the host vehicle and the parallax image, overlap incongruity occurs. As a result, when there is a parallax image in front of another object, the brain corrects and recognizes the image. Therefore, even when the parallax image of the guidance object is generated at a position further than the vehicle in front, it is difficult to make the image seem to be disposed at the position further than the vehicle in front.

In order to prevent the breaking of the stereoscopic view, the control unit 34 displays the guidance object on the display unit 21 so as to move forward on the rear side of the vehicle in front while floating, thereby guiding the host vehicle. In addition, the control unit 34 may display the guidance object so as to move in the vertical direction or the horizontal direction in order to prevent the guidance object from overlapping a neighboring vehicle. In addition, the overlap between the host vehicle and the vehicle in front may be determined by, for example, the determination of am image captured by a camera attached to a head-mounted display or by a 3D camera or a mounted distance measurement device such as a distance measurement radar.

Returning to FIG. 2, when the guidance object is generated and displayed in S4, the control unit 34 acquires the current position using the GPS receiving unit 12 and determines whether the host vehicle travels in the vicinity of an intersection where the host vehicle is guided to turn right or left (S5). When it is determined that the host vehicle travels in the vicinity of the intersection where the host vehicle is guided to turn right or left, the control unit 34 changes the display content of the guidance object on the basis of whether there is a vehicle in front (S6).

Figure 4:
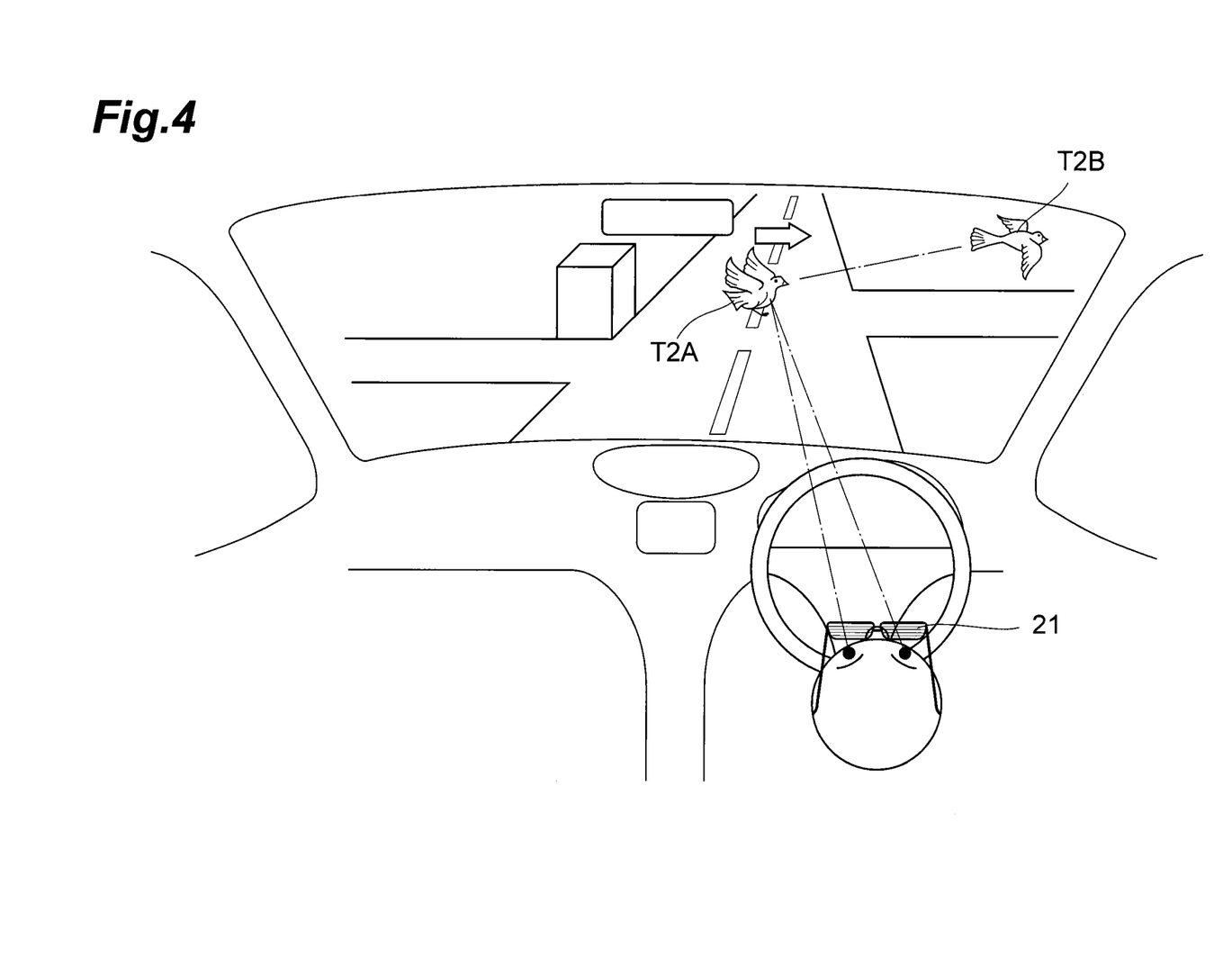
FIG. 4 is an outline diagram illustrating an example of the route guidance performed by the navigation apparatus shown in FIG. 1.

A change in the display content of the guidance object by the control unit 34 will be described with reference to FIGS. 4 and 5. FIG. 4 shows the display content of the guidance object when there is no vehicle in front at the intersection where the host vehicle is guided to turn right. In this case, when the host vehicle approaches the intersection where the host vehicle is guided to turn right, the guidance object is accelerated from a normal position, reaches the intersection prior to the host vehicle, and lands on the road at the center of the intersection (guidance object T2A).

The direction of the head of the guidance object T2A landed on the intersection indicates a way to get out of the intersection. In addition, when an image other than the bird is used as the guidance object, the content of display is changed depending on the kind of guidance object such that the driver can easily recognize the traveling route. For example, the content of display may be changed such that a signboard with an arrow indicating the traveling direction is displayed or an arrow is drawn above the guidance object.

Then, the guidance object T2A flights in the right-turn direction, gets out of the intersection, and hovers over that position (hovering) to guide the host vehicle (guidance object T2B). As such, the display content of the guidance object is changed to show a way to pass through the intersection. Therefore, even when there are a plurality of successive intersections near the host vehicle, it is possible to clearly guide the host vehicle along the traveling route.

Figure 5:
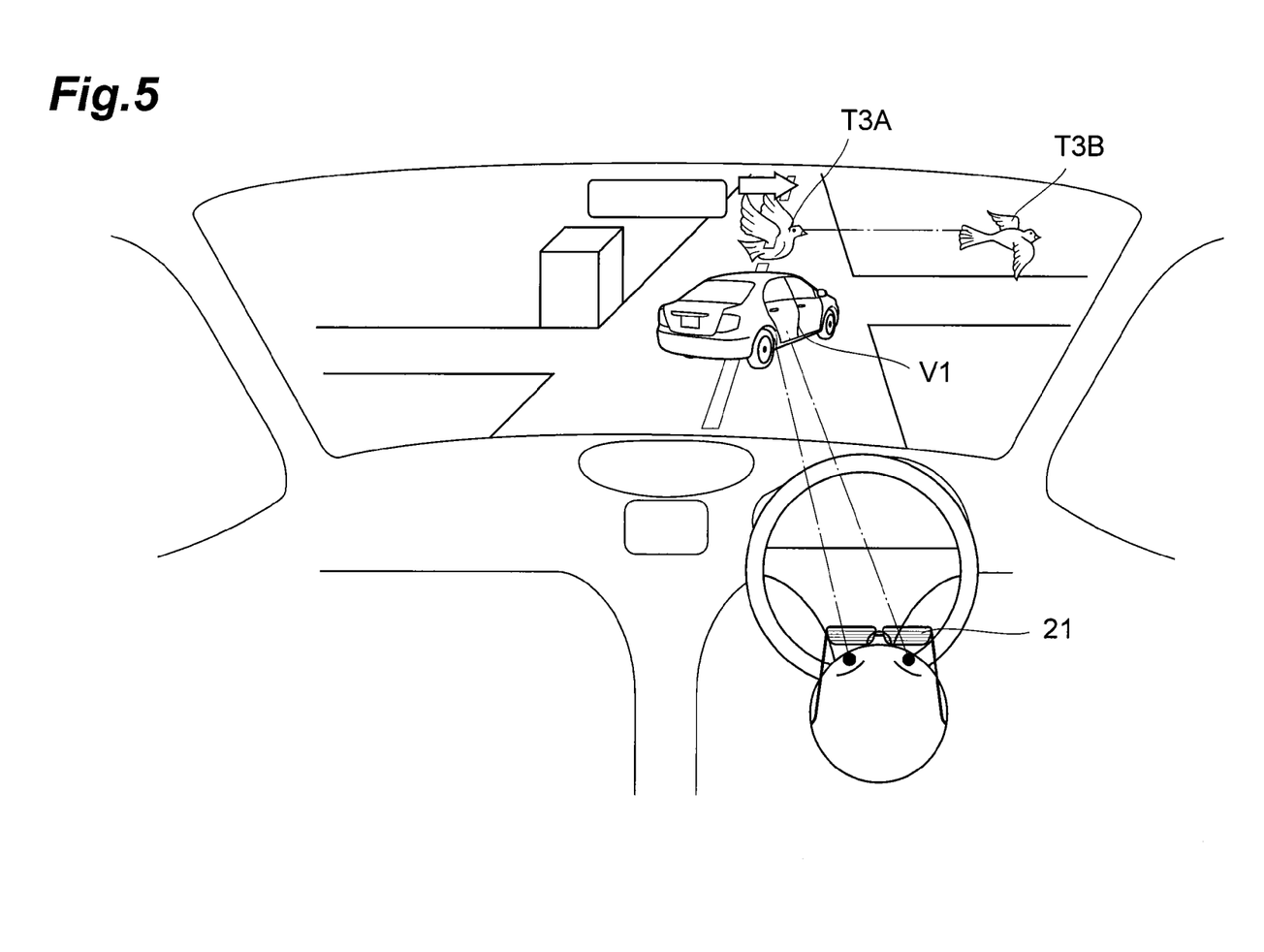
FIG. 5 is an outline diagram illustrating an example of the route guidance performed by the navigation apparatus shown in FIG. 1.

FIG. 5 shows the display content of the guidance object when there is a vehicle V1 in front at the intersection where the host vehicle is guided to turn right. In this case, when the host vehicle approaches the intersection where the host vehicle is guided to turn right, a guidance object T3A moves forward over the roof of the vehicle in front V1 and hovers over the center of the intersection. Then, the guidance object T3A flights in the right-turn direction, gets out of the intersection, and hovers over that position (guidance object T3B), thereby guiding the host vehicle. When the vehicle in front disappears during the guidance of the host vehicle along the guidance route, the image of the bird on the ground may be displayed as the guidance object T2A shown in FIG. 4.

Figure 6:
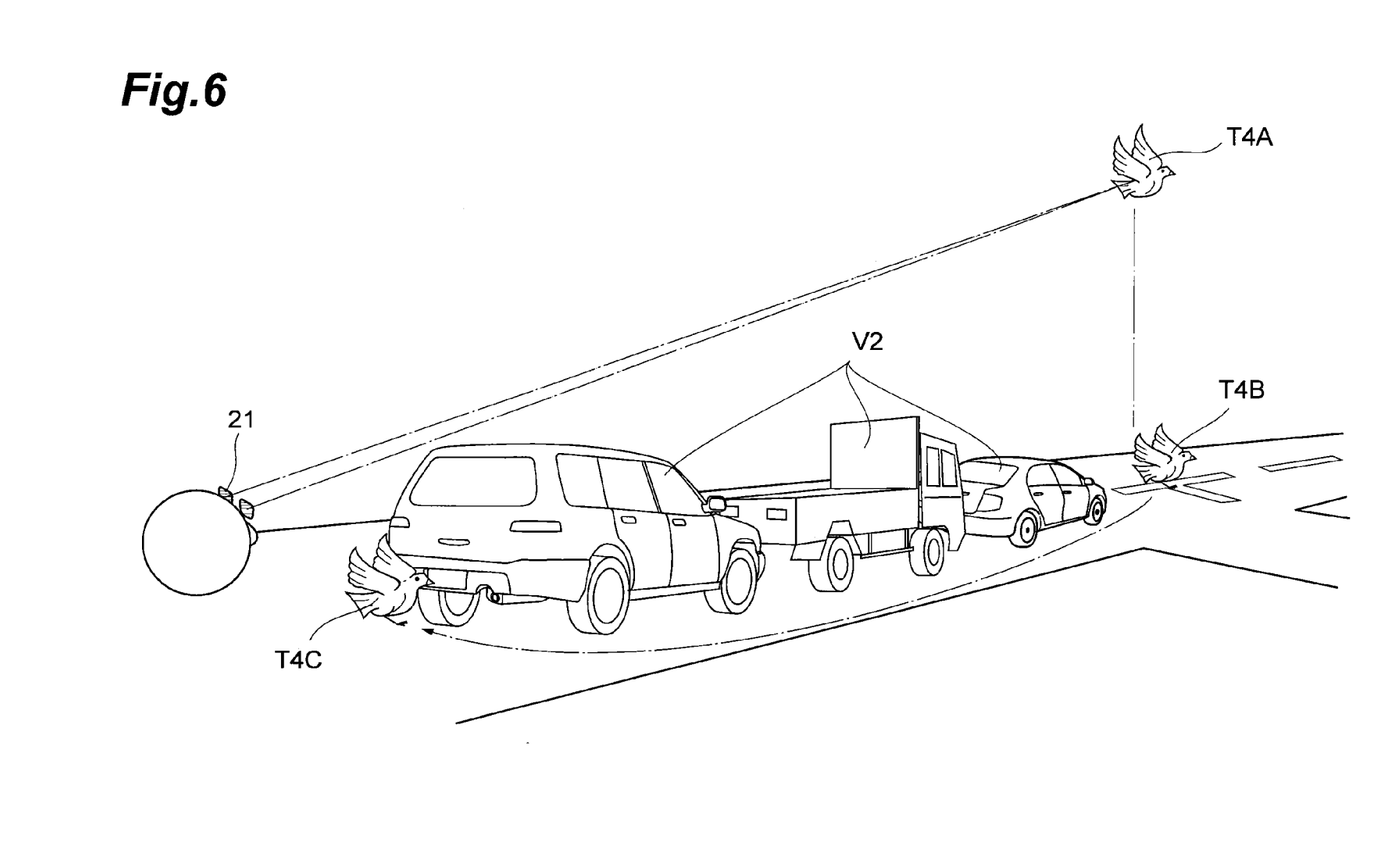
FIG. 6 is an outline diagram illustrating an example of the route guidance performed by the navigation apparatus shown in FIG. 1.

In the example shown in FIG. 5, the guidance object is displayed so as to hover over the center of the intersection in order to prevent a stereoscopic view from being broken due to the above-mentioned memory factor. Next, the breaking of the stereoscopic view due to the memory factor will be described with reference to FIG. 6. As shown in FIG. 6, when a guidance object T4B is displayed in the vicinity of the ground at the intersection where there is a vehicle V2 in front, incongruity in the overlap between the guidance object T4B and the vehicle V2 in front occurs and the stereoscopic view is broken due to the memory factor. In this way, the driver feels as if the guidance object T4B lands at the position indicated by a guidance object T4C.

In contrast, when there is a vehicle in front, the guidance object T4A is displayed above the center of the intersection. Therefore, it is possible to display the guidance object without an overlap. Since the display content of the guidance object is changed in this way, it is possible to clearly indicate the position where the host vehicle will turn right or left.

Returning to FIG. 2, when S6 ends, the control unit 34 determines whether route guidance has ended (S7). When it is determined whether the route guidance has ended, a series of navigation processes ends.

On the other hand, when the control unit 34 determines that the host vehicle does not travel in the vicinity of the intersection where the host vehicle is guided to turn right or left in S5, the process proceeds to S7. When it is determined in S7 that the route guidance has not ended, the process proceeds to S3 and is repeated until the route guidance ends.

As described above, according to the navigation apparatus 1 of this embodiment, the control unit 34 displays a floating object as the guidance object on the display unit 21 so as to move forward while shaking. Therefore, even when the guidance object is displayed at the position where the guidance object and the vehicle in front overlap each other, it is possible to perform route guidance which is easily recognized by the driver.

Since the guidance object is a floating object, incongruity is small even when the guidance object soars into the air or moves down near the ground. Therefore, it is possible to perform route guidance which is easily recognized by the driver.

This embodiment shows an example of the navigation apparatus according to the invention. The navigation apparatus according to the invention is not limited to the navigation apparatus 1 according to this embodiment, but the navigation apparatus 1 according to this embodiment may be changed within the scope of the claims or the invention may be applied to other apparatuses.

For example, in the above-described embodiment, the display content of the guidance object is changed depending on whether there is a vehicle in front. However, the overlap of the guidance object with obstacles other than the vehicle in front may be detected and the display content of the guidance object may be changed.

In the above-described embodiment, guidance is changed depending on whether the vehicle enters the intersection. However, guidance may be changed in other points. For example, guidance may be changed at important points where the enlarged view of the intersection is displayed by a general navigation apparatus.

REFERENCE SIGNS LIST

1: NAVIGATION APPARATUS
11: OPERATION UNIT
12: RECEIVING UNIT
13: CAMERA
21: DISPLAY UNIT
31: ROUTE SEARCH UNIT
32: MAP DATABASE
33: NEIGHBORING VEHICLE INFORMATION ACQUIRING UNIT
34: CONTROL UNIT
T1, T2A, T2B, T3A, T3B, T4A, T4B, T4C: GUIDANCE OBJECT
V1, V2: VEHICLE IN FRONT

The invention claimed is:

1. A navigation apparatus that performs route guidance to a destination, comprising:
   a display unit that displays an image so as to be superimposed on a field of view of a driver; and
   a control unit that displays an image of a guidance object for the route guidance on the display unit such that the guidance object moves along a route in advance, thereby performing the route guidance,
   wherein the control unit stereoscopically displays the guidance object using a parallax image, and
   when there is a vehicle in front at an intersection where a right or left turn is guided, the control unit displays the guidance object above the intersection without an overlap between the guidance object and the vehicle in front.

2. The navigation apparatus according to claim 1, wherein the control unit displays an image of an object which moves in a vertical direction or a horizontal direction as the guidance object.

3. The navigation apparatus according to claim 1, wherein the control unit displays an image of a floating object as the guidance object.

4. The navigation apparatus according to claim 1, wherein the control unit displays an image of an object which moves forward while shaking as the guidance object.

5. The navigation apparatus according to claim 1, wherein the control unit determines whether the guidance object overlaps an object around a host vehicle and displays the guidance object at a position different from that of the object around the host vehicle so as to deviate from the object, thereby performing the route guidance, when it is determined that the guidance object overlaps the object around the host vehicle.

6. The navigation apparatus according to claim 1, wherein the control unit displays the image of the guidance object on the display unit such that the guidance object is stopped at an intersection where a right or left turn is guided while facing a direction in which it gets out of the intersection and moves in the direction in which it gets out of the intersection, thereby performing the route guidance.

7. The navigation apparatus according to claim 1, wherein the control unit changes the kind of the guidance object displayed on the display unit in response to an operation of the driver.

8. The navigation apparatus according to claim 1, wherein, when the host vehicle approaches the intersection where the right or left turn is guided, the control unit displays the guidance object such that the guidance object reaches the intersection earlier than the driver.

9. The navigation apparatus according to claim 1, wherein, when there is a vehicle in front, the control unit displays the guidance object such that the guidance object moves on a rear side of the vehicle in front, as viewed from the driver, without overlapping the vehicle in front.

* * * * *